R. A. MUDGE.
DEVICE FOR SECURING REMOVABLE TREADS ON MOTOR TIRES.
APPLICATION FILED JULY 19, 1920.

1,358,975.

Patented Nov. 16, 1920.

Inventor
Roger Allan Mudge
By
B. Singer, Atty.

R. A. MUDGE.
DEVICE FOR SECURING REMOVABLE TREADS ON MOTOR TIRES.
APPLICATION FILED JULY 19, 1920.
1,358,975.
Patented Nov. 16, 1920.
2 SHEETS—SHEET 2.
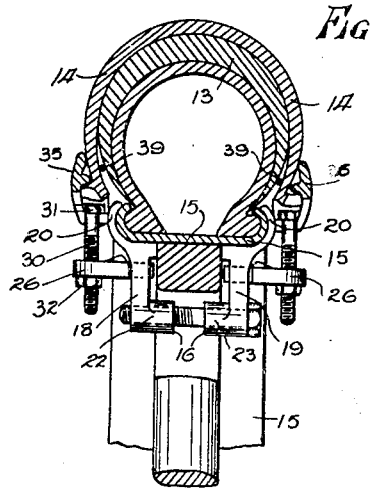
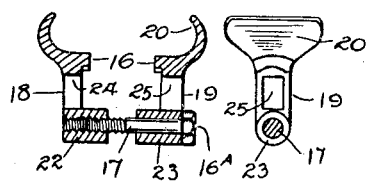
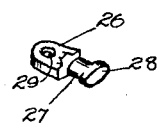
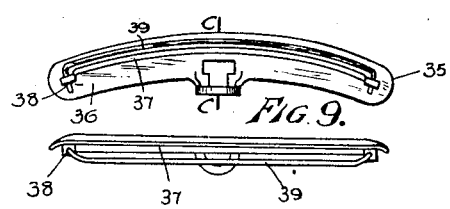

UNITED STATES PATENT OFFICE.

ROGER ALLAN MUDGE, OF SUTHERLAND, NEAR SYDNEY, NEW SOUTH WALES, AUSTRALIA.

DEVICE FOR SECURING REMOVABLE TREADS ON MOTOR-TIRES.

1,358,975.   Specification of Letters Patent.   Patented Nov. 16, 1920.

Application filed July 19, 1920. Serial No. 397,432.

*To all whom it may concern:*

Be it known that I, ROGER ALLAN MUDGE, a subject of the King of Great Britain, residing at Sutherland, near Sydney, in the State of New South Wales, Commonwealth of Australia, have invented certain new and useful Improvements in Devices for Securing Removable Treads on Motor-Tires, of which the following is a specification.

This invention has reference to clamping devices whereby treads, or a section of a tread, preferably formed from old tire covers, may be secured on the tires of motor vehicles and has been devised with the object of providing a ready attachable device whereby the protecting or supplementary tread may be securely held in position without danger of creep, excessive friction, or ingress of dirt.

In the accompanying sheet of drawings,

Fig. 5 is a sectional elevation of the clamping device in position securing a supplementary tread or old cover on a tire.

Fig. 6 is a vertical section of clamp jaws.

Fig. 7 is an elevation of one of the jaws.

Figs. 8 and 9 are inside elevation and plan respectively of the tire attachment member.

Fig. 10 is a section through the tire attachment member.

Fig. 11 is a perspective view of a link bolt.

Figure 1:
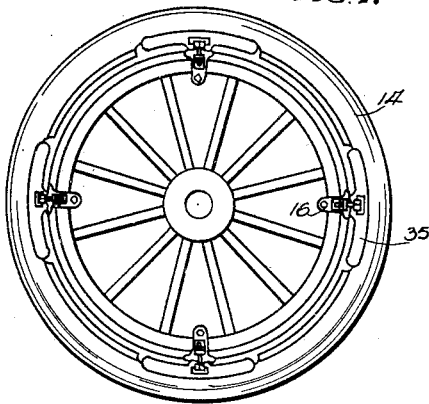
Figure 1 is an elevation of a motor wheel with an old or supplementary tire cover clamped thereon.
Figure 2:
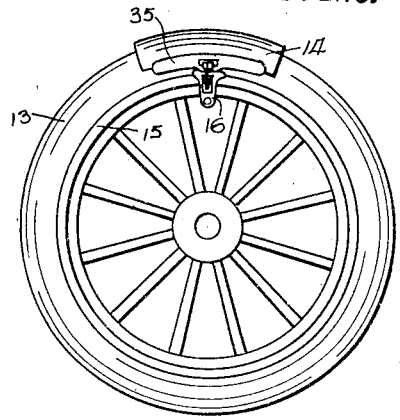
Fig. 2 is a similar view with a garter or section of an old tire cover clamped thereon over a perforation or weakness in a tire cover.
Figure 3:
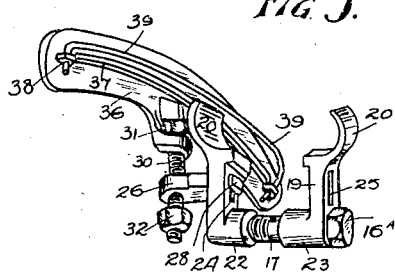
Fig. 3 is a perspective view of the clamp, one tire cover attachment member and bolt being omitted for sake of clearness.
Figure 4:
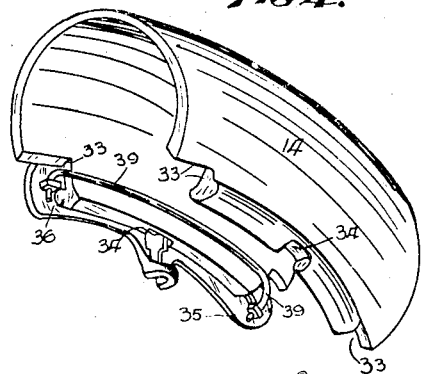
Fig. 4 is a perspective view illustrating the attachment member on one side of a garter.

13 represents the usual cover of a tire and 14 a supplementary cover tread which is secured by the clamp device over the cover 13. This clamp comprises a transverse tension bolt 17 carrying the jaw members 20 which are adapted to contact against opposite outer sides of the wheel rim 15. The shanks 18 and 19 of the jaws are sufficiently long to clear the felly 21 of the wheel. These shanks have bosses 22 and 23 the bolt 17 passing through a clearance hole in the boss 23 but screwing into the threaded boss 22. The shanks 18 and 19 have the rectangular openings 24 and 25 respectively in which are detachably held the link bolts 26 provided with a partially flanged extension 27 which when the bolt is turned at right angles enables the extension to be inserted or withdrawn from its opening 24 or 25. When the bolt has been inserted in said opening and turned to an angle of 90° its side flanges 28 are held to the shank on the same side. The link 26 has a hole 29 through which is placed a threaded bolt 30 provided with a head 31 and a nut 32, one side of the head 31 being flush with the seat of the removable clip member hereinafter described.

The supplementary tread 14 has its bead cut away at 33 to permit the fitting of the clips 35 of the tire attachment member and is also cut away at 34 to permit the bolt head 31 to enter the opening formed in the clip 35. This clip 35 consists of a segmental metal plate having a segmental projection 37 provided with holes 38 at opposite ends to receive the bent ends of a segmental wire or rod 39 between which wire and metal plate the bead of the tire is clenched or held.

In fixing a tread in position the beads of the tire are cut on opposite sides and the clips 35 attached to the edges of the tread as described. The heads 31 of the threaded bolts 30 are then passed through the openings in their respective clips the link bolts 26 having previously been placed on the bolts 30 and their flanged extensions through the openings 24 and 25 in the shanks of the respective jaws 20. These jaws are brought into engagement with the outer faces of the rim and tensioned by means of the nut 16ᴬ. The nuts 32 on the bolts 30 are then tightened until sufficient tension is exerted by their heads 31 on the clips 35 to draw the supplementary tread into position.

The garter or supplementary cover is readily removable on unscrewing the several nuts.

Having thus described my invention, what I claim as new and desire to protect by Letters Patent, is:—

1. In a clamp device for securing treads on the tires of motor vehicles, clips removably attachable to the opposite edges of the tread, screw bolts provided with heads adapted to engage with said clips, links carried by said bolts and having heads, jaw members positioned on opposite sides of the rim and having shanks engaged by the heads of the links, and a tension bolt connecting said shanks and capable of effecting the engagement or disengagement of said jaws with the adjacent faces of the rim.

2. In a clamp device of the character described, tread attachment members each consisting of a metal plate, provided with a projection, and a detachable wire adapted to hold or clench the circumferential edge of the tread between them, said plate being provided with an opening to take the head of a tension bolt substantially as described.

3. In a clamp device of the character described, jaws positioned adjacent to the sides of the rim and having shanks, links connected to the shanks of said jaws, screw bolts, tread holding plates to which the screw bolts are coupled, and transverse adjustable tension bolts connecting said shanks and adapted to effect engagement or disengagement of said jaws with the adjacent sides of the rim.

In testimony whereof I have hereunto set my hand in presence of two subscribing witnesses.

ROGER ALLAN MUDGE.

Witnesses:
CHARLES EDWARD GRAHAM,
HENRY WATCHORNE CLARKE.